(12) United States Patent
Johann (10) Patent No.: US 8,251,648 B2
(45) Date of Patent: Aug. 28, 2012

(54) CASING TREATMENT FOR AXIAL COMPRESSORS IN A HUB AREA

(75) Inventor: Erik Johann, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 655 days.

(21) Appl. No.: 12/379,788

(22) Filed: Feb. 27, 2009

(65) Prior Publication Data

US 2009/0246007 A1 Oct. 1, 2009

(30) Foreign Application Priority Data

Feb. 28, 2008 (DE) .......................... 10 2008 011 644

(51) Int. Cl.
*F01D 5/20* (2006.01)
(52) U.S. Cl. .................................... 415/173.1; 415/914
(58) Field of Classification Search ............... 415/173.1, 415/182.1, 914, 58.2, 131, 144, 220, 57.4; 277/418
See application file for complete search history.

(56) References Cited

U.S. PATENT DOCUMENTS

| | | | |
|---|---|---|---|
| 2,933,238 A | 4/1960 | Stalker | |
| 3,066,912 A | 12/1962 | Scheper | |
| 3,572,960 A | 3/1971 | McBride | |
| 3,694,102 A | 9/1972 | Conrad | |
| 3,846,038 A | 11/1974 | Carriere et al. | |
| 3,849,023 A | 11/1974 | Klompas | |
| 3,993,414 A | 11/1976 | Meauze et al. | |
| 4,155,680 A | 5/1979 | Linko et al. | |
| 4,415,310 A | 11/1983 | Bouiller et al. | |
| 4,466,772 A | 8/1984 | Okapuu et al. | |
| 4,479,755 A | 10/1984 | Skoe | |
| 4,642,027 A | 2/1987 | Popp | |
| 4,659,282 A | 4/1987 | Popp | |
| 5,059,093 A | 10/1991 | Khalid et al. | |
| 5,203,162 A | 4/1993 | Burge | |
| 5,230,605 A | 7/1993 | Yamaguchi | |

(Continued)

FOREIGN PATENT DOCUMENTS

DE 889506 9/1953

(Continued)

OTHER PUBLICATIONS

German Search Report dated Jun. 8, 2011 for counterpart German patent application.

(Continued)

*Primary Examiner* — Caridad Everhart
(74) *Attorney, Agent, or Firm* — Timothy J. Klima; Shuttleworth & Ingersoll, PLC (57) ABSTRACT

A fluid flow machine includes a flow path formed by a casing 1 and a rotating shaft 2, in which rows of blades 3 are provided, with at least one annular groove-type recess 4 being arranged in a blade 3 tip area in an annulus duct wall of the shaft 2. A cross-section and the position of the recess 4 are defined as follows: the axial arrangement is selected such that a partial length A of the recess 4 extends by max. 30 percent of the chord length of a blade 3 from the blade 3 leading edge against the direction of flow, and up to max. 50 percent of the chord length of the blade 3 from the blade 3 leading edge in the direction of flow.

24 Claims, 10 Drawing Sheets

U.S. PATENT DOCUMENTS

| | | | |
|---|---|---|---|
| 5,308,225 A | 5/1994 | Koff et al. | |
| 5,327,716 A | 7/1994 | Giffin et al. | |
| 5,431,533 A | 7/1995 | Hobbs | |
| 5,474,417 A | 12/1995 | Privett et al. | |
| 5,480,284 A | 1/1996 | Wadia et al. | |
| 5,707,206 A * | 1/1998 | Goto et al. | 415/173.1 |
| 5,762,034 A | 6/1998 | Foss | |
| 5,762,470 A | 6/1998 | Gelmedov et al. | |
| 5,876,182 A | 3/1999 | Schulte | |
| 5,950,308 A | 9/1999 | Koff et al. | |
| 6,109,868 A | 8/2000 | Bulman et al. | |
| 6,234,747 B1 | 5/2001 | Mielke et al. | |
| 6,290,458 B1 | 9/2001 | Irie et al. | |
| 6,574,965 B1 | 6/2003 | Feuner | |
| 6,585,479 B2 | 7/2003 | Torrance | |
| 6,619,909 B2 | 9/2003 | Barnett et al. | |
| 6,663,346 B2 | 12/2003 | Munsell et al. | |
| 6,742,983 B2 | 6/2004 | Schmuecker | |
| 6,832,890 B2 | 12/2004 | Booth | |
| 7,077,623 B2 | 7/2006 | Guemmer | |
| 7,097,414 B2 | 8/2006 | Stangeland | |
| 7,186,072 B2 | 3/2007 | Seitz | |
| 7,387,487 B2 | 6/2008 | Guemmer | |
| 7,575,412 B2 | 8/2009 | Seitz | |
| 7,594,793 B2 | 9/2009 | Guemmer | |
| 7,645,121 B2 | 1/2010 | Tudor | |
| 7,811,049 B2 | 10/2010 | Xu | |
| 7,861,823 B2 | 1/2011 | Prasad et al. | |
| 2003/0026695 A1 | 2/2003 | Schmuecker | |
| 2004/0081552 A1 | 4/2004 | Guemmer | |
| 2005/0019152 A1 | 1/2005 | Seitz | |
| 2005/0058541 A1* | 3/2005 | Le Biez et al. | 415/173.4 |
| 2005/0226717 A1* | 10/2005 | Xu | 415/58.5 |
| 2005/0238483 A1 | 10/2005 | Guemmer | |
| 2006/0051199 A1 | 3/2006 | Guemmer | |
| 2006/0104805 A1 | 5/2006 | Guemmer | |
| 2006/0153673 A1 | 7/2006 | Guemmer | |
| 2008/0044273 A1 | 2/2008 | Khalid | |
| 2008/0199306 A1* | 8/2008 | Lebret | 415/131 |
| 2009/0160135 A1* | 6/2009 | Turini et al. | 277/418 |
| 2009/0290974 A1 | 11/2009 | Bayere et al. | |

FOREIGN PATENT DOCUMENTS

| | | |
|---|---|---|
| DE | 1042828 | 11/1958 |
| DE | 1428188 | 11/1968 |
| DE | 3407945 | 9/1985 |
| DE | 19632207 | 2/1998 |
| DE | 10135003 | 10/2002 |
| DE | 10233032 | 1/2004 |
| DE | 10330084 | 3/2004 |
| DE | 102004043036 | 3/2006 |
| EP | 0497574 | 9/1995 |
| EP | 0718469 | 6/1996 |
| EP | 0754864 | 1/1997 |
| EP | 0719908 | 3/2000 |
| EP | 1013937 | 6/2000 |
| EP | 1286022 | 2/2003 |
| EP | 1382855 | 1/2004 |
| GB | 619722 | 3/1949 |
| GB | 987625 | 3/1965 |
| GB | 2408546 | 6/2005 |
| WO | 9510692 | 4/1995 |

OTHER PUBLICATIONS

German Search Report dated Oct. 14, 2011 from related application [542].

Yang, Zhou. "Boundary Layer Separation Control on a Highly-Loaded, Low-Solidity Compressor Cascade." Journal of Thermal Science 19.2 (2010): 97-104.

Strazisar, A.J., Bright, M.B., Thorp, S., Gulley, D.E., Suder, K.L., "Compressor Stall Control Through Endwall Recirculation", ASME GT2004-54295, proceedings of the ASME Turbo Expo 2004, Jun. 14-17, 2005, Vienna, Austria.

Gao, P., Zhang, Y., Zhang, S., "Numerical Investigation of the Different Casing Treatment in a Centrifugal Compressor", Proceeding APWCS '10 Proceeings of the 2010 Asia-Pacific Conference on Wearable Computing Systems.

Moore, R., Effect of Casing Treatment on Overall and Blade-Element Performance of a Compressor Rotor. NASA TN D-6538. Nov. 1971.

Jian H., Hu, W., "Numerical Investigation of Inlet Distortion on an Axial Flow Compressor Rotor with Circumferential Groove Casing Treatment", Chinese Journal of Aeronautics, 21 (2008) 496-505.

Friedrichs, Jens, Sven Baumgarten, Gunter Kosyna, and Udo Stark, "Effect of Stator Design on Stator Boundary Layer Flow in a Highly Loaded Single-Stage Axial Flow Low-Speed Compressor." Journal of Turbomachinery 123.3 (2001): 483.

German Search Report dated Jul. 1, 2001 from a related application [596].

European Search Report dated Nov. 22, 2006 from related patent application [472].

* cited by examiner

CASING TREATMENT FOR AXIAL COMPRESSORS IN A HUB AREA

This application claims priority to German Patent Application DE102008011644.0 filed Feb. 28, 2008, the entirety of which is incorporated by reference herein.

The aerodynamic loadability and the efficiency of fluid flow machines such as blowers, compressors, pumps and fans, is limited in particular by the growth and the separation of boundary layers in the rotor and stator blade tip area near the casing or the hub wall, respectively. On blade rows with running gaps, this leads to re-flow phenomena and the occurrence of instability of the machine at higher loads. Fluid flow machines according to the state of the art either have no particular features to provide remedy in this area, or so-called casing treatments are used as counter-measure including the most varied configurations of chambers and/or angular slots, mostly in the casing above the rotor.

Known solutions are revealed for example in the following documents:
US 2005/0226717 A1 (Flow Control Arrangement)
DE 101 35 003 C1 (Compressor Casing Structure)
DE 103 30 084 A1 (Recirculation Structure for Turbocompressors)

The present invention therefore relates to fluid flow machines, such as blowers, compressors, pumps and fans of the axial, semi-axial and radial type. The working medium or fluid may be gaseous or liquid.

The fluid flow machine according to the present invention may include one or several stages, each of which having a rotor and a stator.

According to the present invention, the rotor includes of a number of blades which are connected to the rotating shaft of the fluid flow machine and impart energy to the working medium. The rotor features a free blade end on the casing. The stator in accordance with the present invention includes a number of stationary blades which, on the casing side, have a fixed blade end.

In accordance with the present invention, the fluid flow machine may be provided with a special type of stator upstream of the first rotor, a so-called inlet guide vane assembly.

According to the present invention, at least one stator or inlet guide vane assembly, instead of being fixed, can be variable to change the angle of attack. A spindle accessible from the outside of the annulus duct can, for example, accomplish such a variation.

The fluid flow machine may, in a special form, be provided with at least one row of variable rotors.

In an alternative configuration, said fluid flow machine may also have a bypass configuration, with the single-flow annulus duct dividing into two concentric annuli behind a certain blade row, with each of these annuli housing at least one further blade row.

More particularly, the present invention relates to the shape of a section of the annulus duct wall along the hub of a fluid flow machine and the arrangement and shaping of recesses in said annulus duct wall section in the area of a blade row with free end and running gap.

A broad aspect of the present invention is to provide a fluid flow machine of the type specified above which, while avoiding the disadvantages of the state of the art, is characterized by exerting a highly effective influence on the boundary layer in the blade tip area.

According to this invention, structure has been provided which enables flow control by way of casing treatment to be optimized by improving the flow boundary conditions of the hub treatment. The present invention therefore provides for an optimized design of circumferential grooves with regard to the axial position of the latter on the rotor below the stators. The grooves have corresponding cross-sections and, according to the present invention, can therefore be geometrically simple and geometrically complex freeform surfaces.

Hub treatment according to the present invention can be provided with both fixed, constant geometry and adaptive, time-variable geometry.

In accordance with the present invention, improved compressor stability is therefore provided which, in dependence of design, can also result in improved efficiency provided the measure enables suction-side separation to be reduced.

With the form of hub treatment according to the present invention, optimum flow in the circumferential groove, in particular in dependence of the axial length, and optimum interaction with the main flow are achieved.

Besides the above mentioned arrangement as a circumferential groove, an arrangement as an axial groove would also be suitable, with the arrangement being radially and axially inclinable. The forwardly inclined arrangement leads to a flattening of the outflow vector, resulting in lower inflow loss.

According to the present invention, provision is therefore made to correspondingly change and modify the hub contour of the compressor in the area of the hub in order to optimize the hub area of the free blade ends of the stators with regard to flow.

The present invention is more fully described in light of the accompanying drawings showing preferred embodiments. In the drawings.

In the following examples identical parts are given the same reference numerals.

Figure 1:
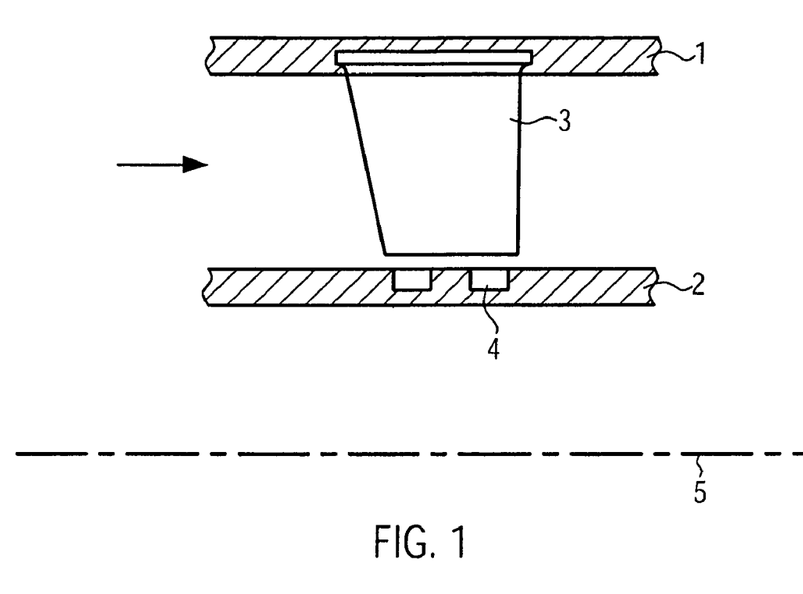
FIGS. 1 and 2 show embodiments of the circumferential grooves according to the present invention.
Figure 2:
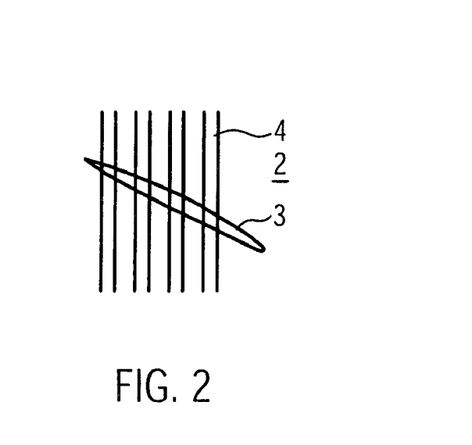

FIG. 1 shows circumferential grooves (annular recesses 4) according to the present invention, these being arranged centrically and in parallel to each other on a hub 2 and having constant thickness and width each (see FIG. 2). According to the present invention, a blade 3 is arranged adjacent to the recesses 4, moving due to the rotation of the hub 2 relative to the casing 1. The invention is applicable to a hub, casing or other surface generally facing free blade ends of stator or rotor blades, where there is relative movement between the free blade ends and the hub/casing/other surface (i.e., either the blades can be moving and/or the facing surface can be moving), and whether the hub/casing/other surface is facing generally radially inwardly or generally radially outwardly, with the blades extending in a generally opposite radial direction from fixed ends.

Figure 3:
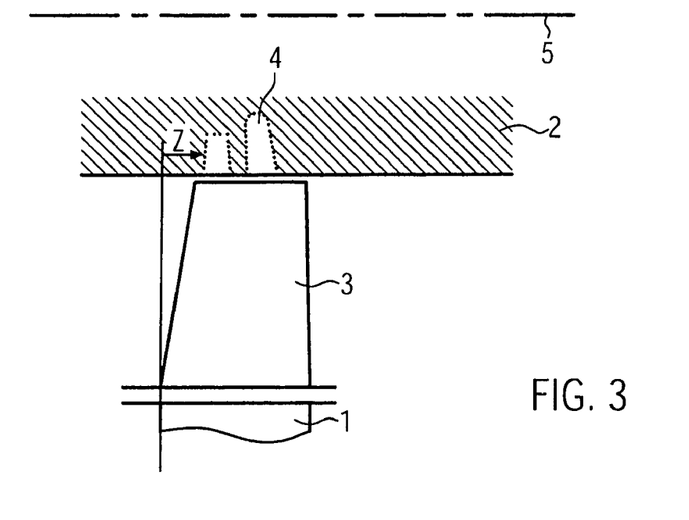
FIGS. 3 to 9 are representations regarding the definition of geometry.
Figure 4:
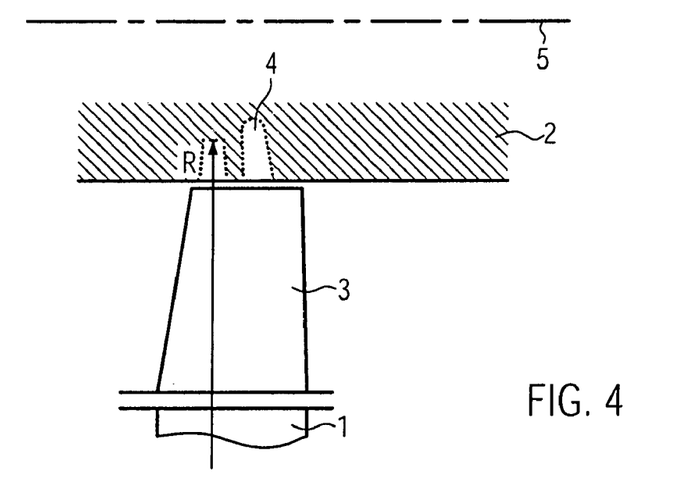
Figure 5:
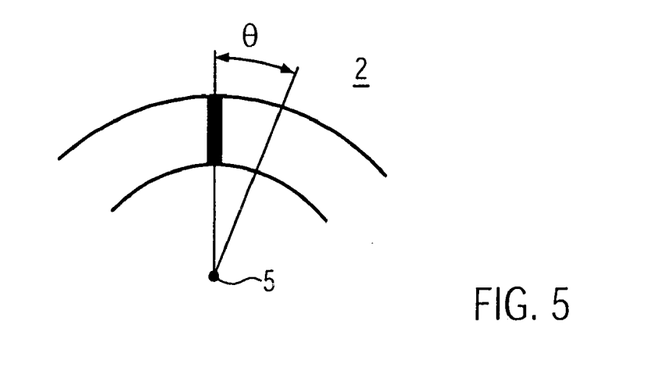

The blade 3 accordingly is a stator blade connected to the casing 1 in relation to which the hub 2 rotates about a center axis/rotary axis/machine axis. FIG. 3 defines the axial position Z of the recess 4, FIG. 4 the radial depth R in relation to the center axis (rotary axis) 5. FIG. 5 defines the circumferential inclination $\theta$.

Figure 6:
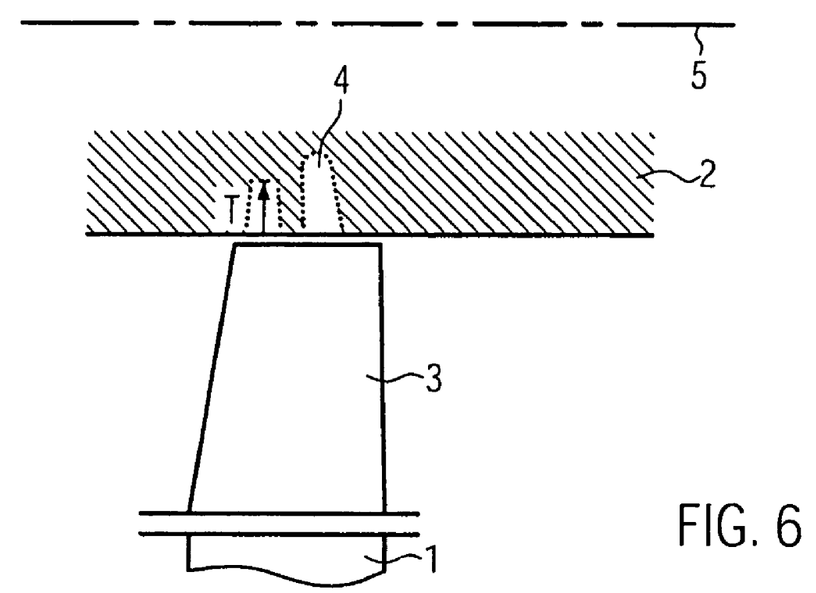
Figure 7:
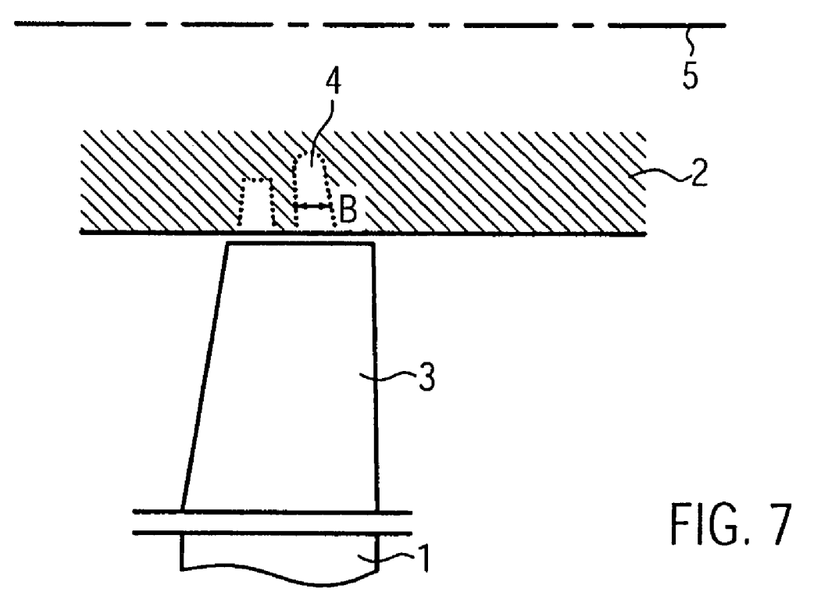
Figure 8:
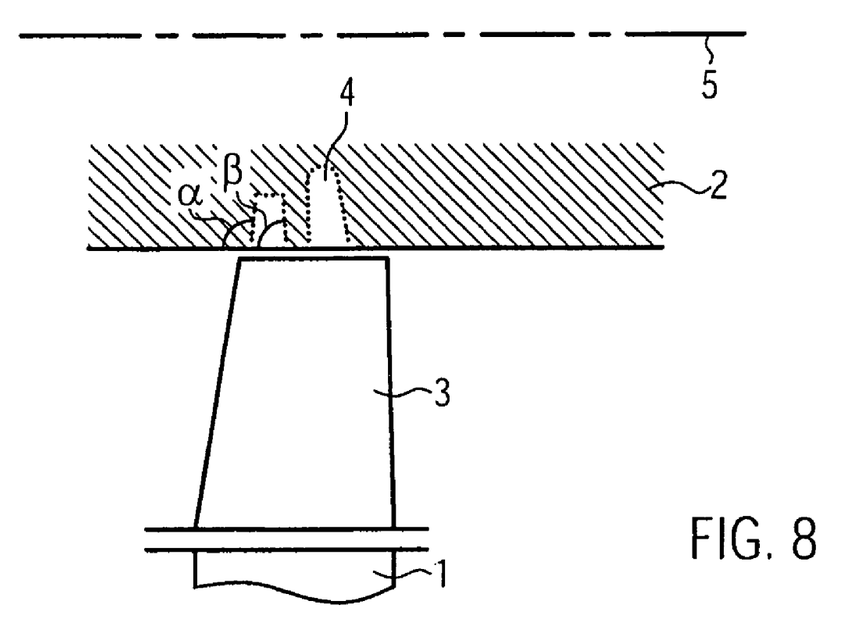
Figure 9:
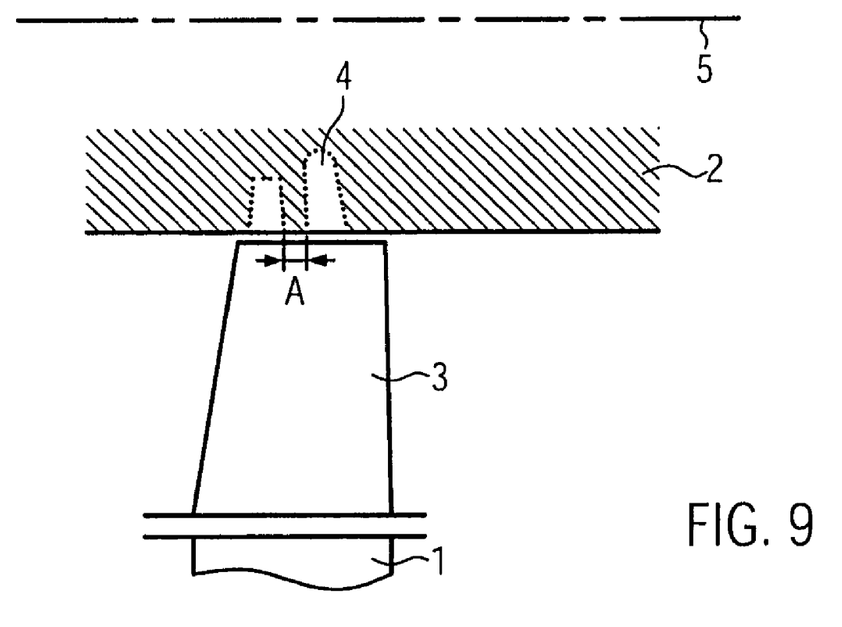

In FIG. 6, the depth of the groove relative to the surface of the hub 2 is marked T, FIG. 7 shows the axial width B of the recess 4 (annular groove). The inclination of the recess 4 in the axial direction is shown in FIG. 8, with the leading edge being inclined by the angle $\alpha$ and the trailing edge by the angle $\beta$. The terms leading edge and trailing edge in each case refer to the direction of flow, which is from the left to the right-hand side in the Figures. FIG. 9 shows the spacing A between two adjacent recesses 4.

Figure 10:
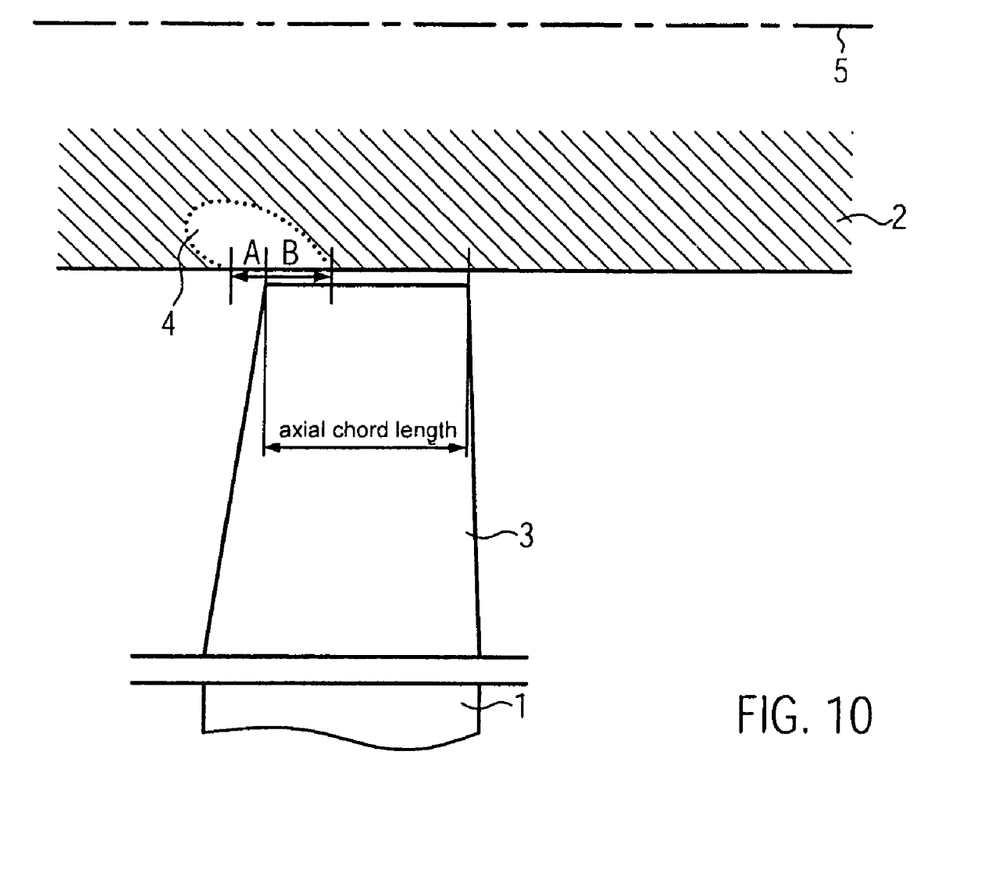
FIGS. 10 to 22 show variants of different embodiments in accordance with the present invention.

FIG. 10 shows a first aspect of the arrangement according to the present invention in which A is the maximum axial chord length before the leading edge of the blade 3. B is the axial chord length in the flow direction. A is preferably a maximum of 30 percent of the axial chord length, while B is a maximum 50 percent, and preferably 30 percent, of the axial chord length. This results in a maximum length of the recess 4 of approximately 80 percent of the axial chord length, and preferably of 50 percent.

Figure 11:
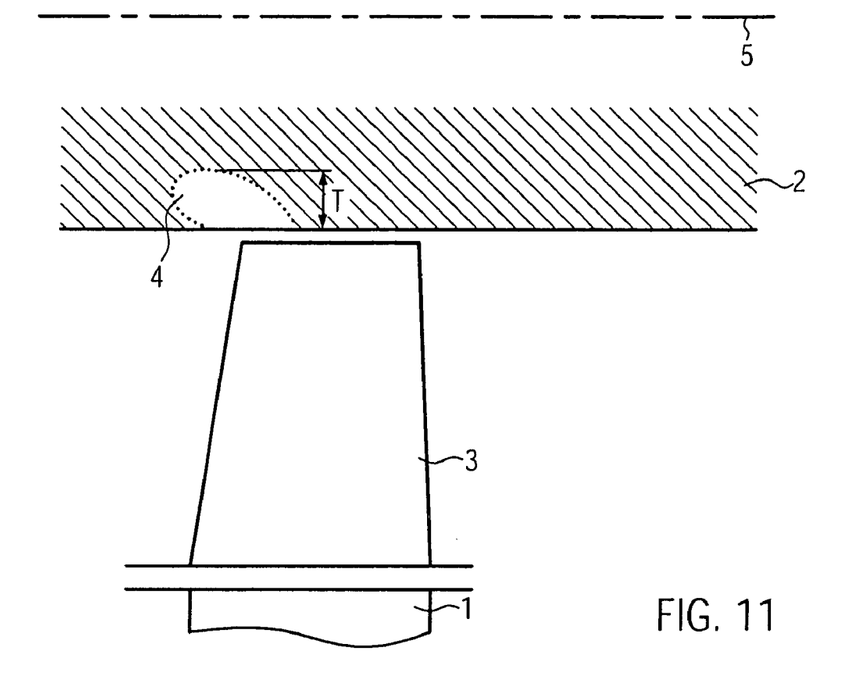

FIG. 11 shows the preferred depth of the recess 4 according to the present invention, which should amount to a maximum of 50 percent of the axial chord length. A preferred value is about 35 percent.

Figure 12:
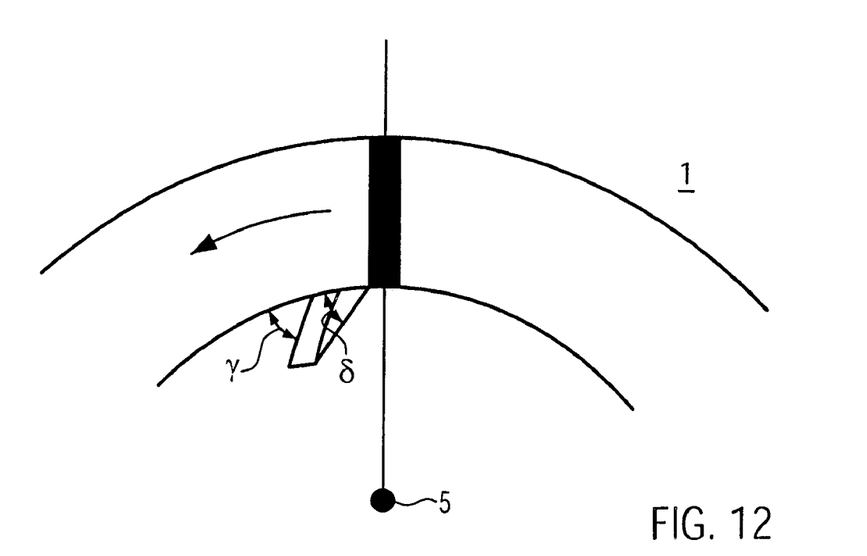

FIG. 12 shows the assignment of angles in the circumferential direction (direction of rotation). The angle $\gamma$ of the forward surfaces preferably lies between 30° and 60°, and the angle $\delta$ of the rearward surface between 30° and 60°. According to the present invention, the two angles can be equal or, when viewed in the axial and radial directions, can also be different and vary within a groove. The latter will result in radial and axial curvature of the contour. The upper end of the recess 4 (radially outward) can be sharp-edged or rounded.

The angles $\gamma$ and $\delta$ shown in FIG. 12 can vary in the direction of flow, with the angles being allowed to vary independently of each other in accordance with the present invention. The angle $\gamma$, which determines the total inclination or outward inclination of the recess 4, can here be varied accordingly.

Figure 13:
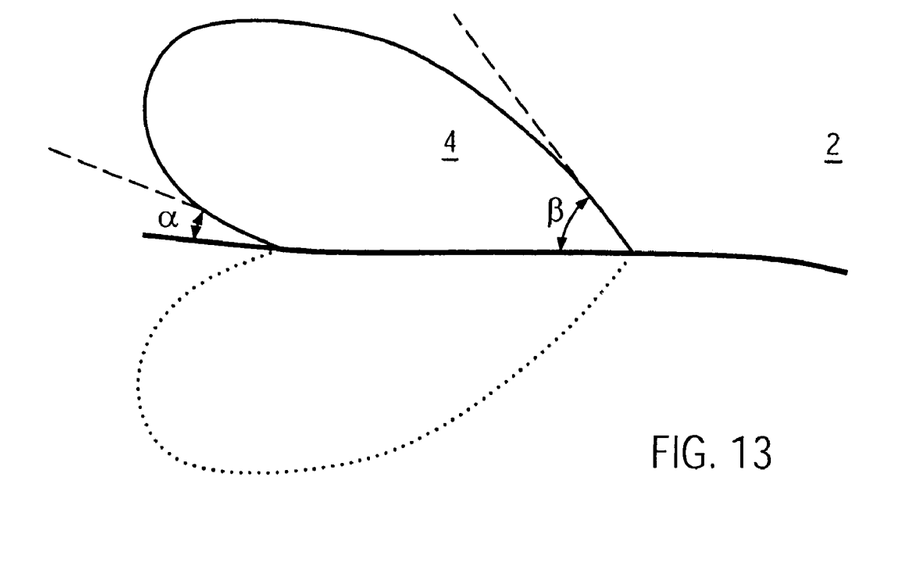

FIG. 13 shows a particularly preferred embodiment of the shape of the recess 4, similar to a half heart (the dashed line conveying the full heart). The course of the contour of the recess 4 is preferably mathematically continuous and/or differentiable.

Figure 16:
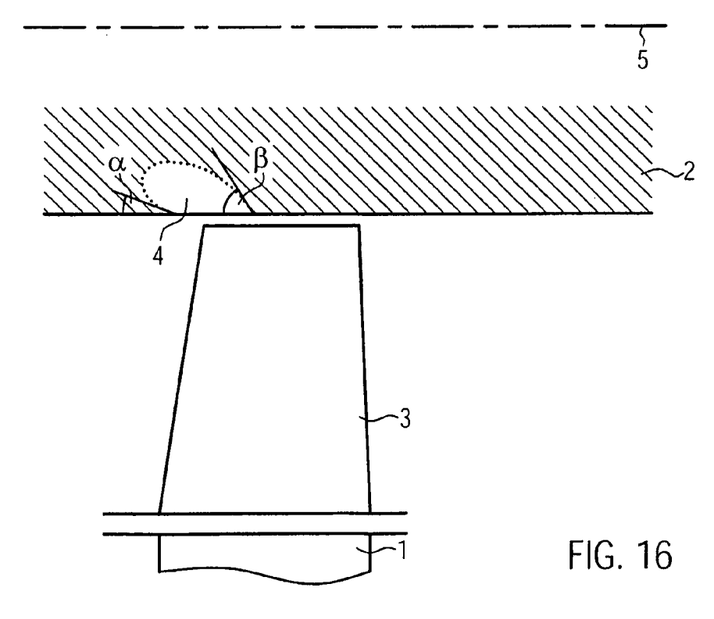

The half-heart shape shown in FIG. 13 is controlled by the two legs of the angles $\alpha$ and $\beta$, also see FIG. 16. As shown in FIG. 16, the two legs of the angles $\alpha$ and $\beta$ set up the start-of-curve or the end-of-curve portion, respectively, of the cross-sectional curve determined by the half-heart shape. As shown in FIG. 16, the angle legs are here tangential to the start-of-curve or the end-of-curve course, respectively (see dashed lines in FIG. 13).

The further course of the curve (half-heart shape) is selected such that it is continuous and, accordingly, two times differentiable. Curvature jumps are thus avoided. The angles $\alpha$ and $\beta$ are selected in accordance with the inflow and outflow conditions of the rotor.

The further course of the curve (half-heart shape) can be defined by B-splines and/or Bézier curves, for example. It is a cardioid which additionally was rotated about an axis (coordinate transformation).

Figure 14:
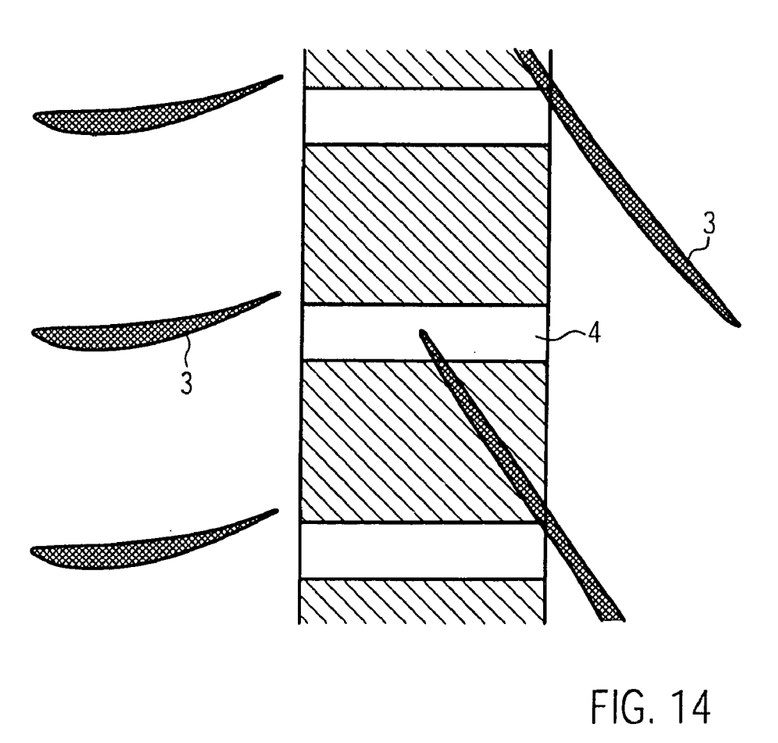

FIG. 14 shows the preferred degree of coverage according to the present invention, which is defined as the ratio of the open area, formed by the recesses 4, and the totally axially (circumferentially) confined area within which the recesses 4 are arranged. Coverage is preferably less than 50 percent, in a preferred embodiment coverage is 30 percent.

FIG. 14 shows an embodiment in which one groove or recess 4 is provided per blade pitch (distance of two adjacent blades). According to the present invention, a smaller number of recesses 4 can also be provided, for example one groove or recess 4 per two blade passages or three blades, respectively. It may therefore occur that, for example, only 8 to 10 recesses 4 or grooves are provided on the circumference of the hub.

In this context, mention should also be made that, in accordance with the present invention, the grooves or recesses 4 need not be distributed equally on the circumference. Rather, they can also be distributed unequally and independently of each other.

Figure 15:
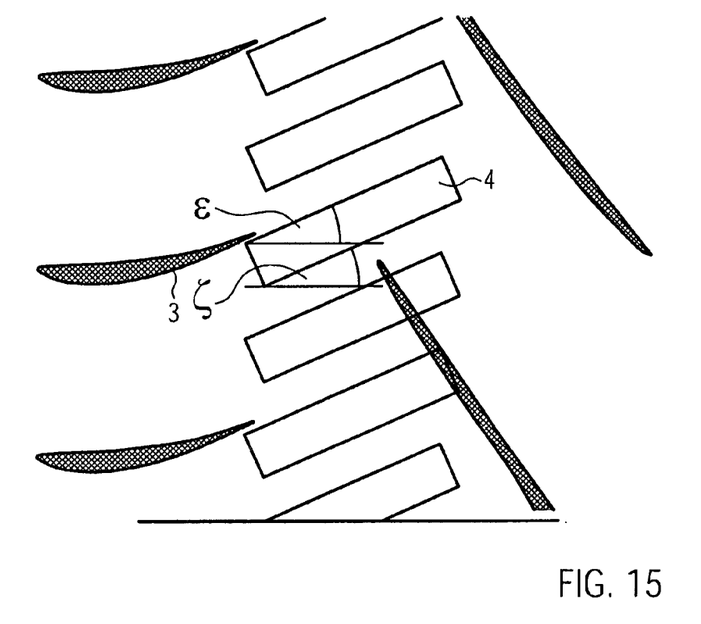

FIG. 15 shows the stagger angle provided according to the present invention. The angle $\epsilon$ lies in a range of +30° to −30°, preferably at 0°. The same values apply to the angle $\zeta$. In accordance with the present invention, the angles can either be equal or axially or radially vary within the annular groove (recess 4). This results in an axial and radial bending of the annular groove 4.

FIG. 16 shows the definition of the angles of the leading and trailing flanks in accordance with the present invention. The exit angle $\alpha$ preferably lies between 20° and 70°, the entry angle $\beta$ between 30° and 80°. In accordance with the present invention, the two angles $\alpha$ and $\beta$ can be equal or different and can also vary, as viewed in the circumferential direction, within the recess 4 (annulus wall groove).

Figure 17:
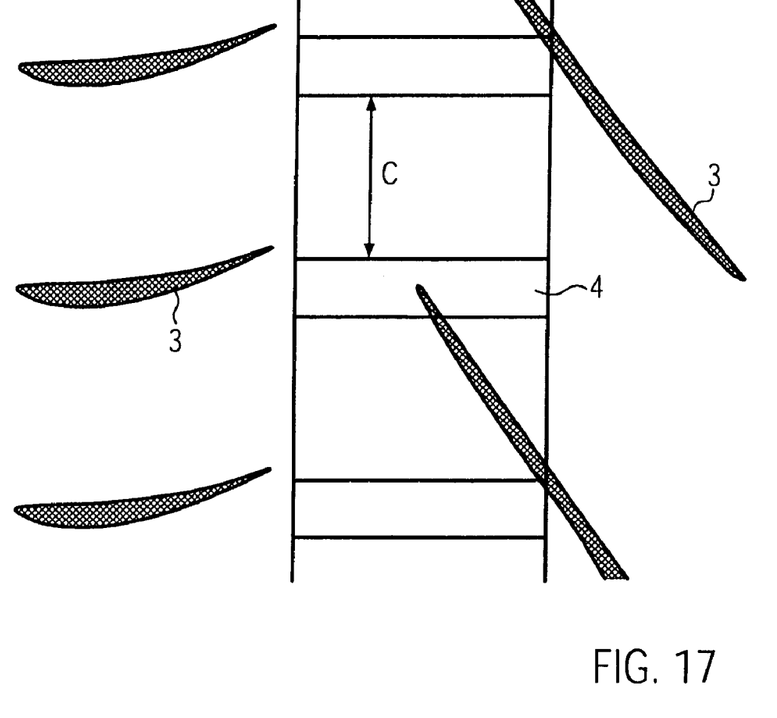

FIG. 17 shows the distance of the individual recesses 4 to each other. Distance C can be circumferentially equal, but can also be variable. Also, distance C can be variable in the radial and/or axial direction, with the above mentioned degree of coverage to be obtained on the whole.

Figure 18:
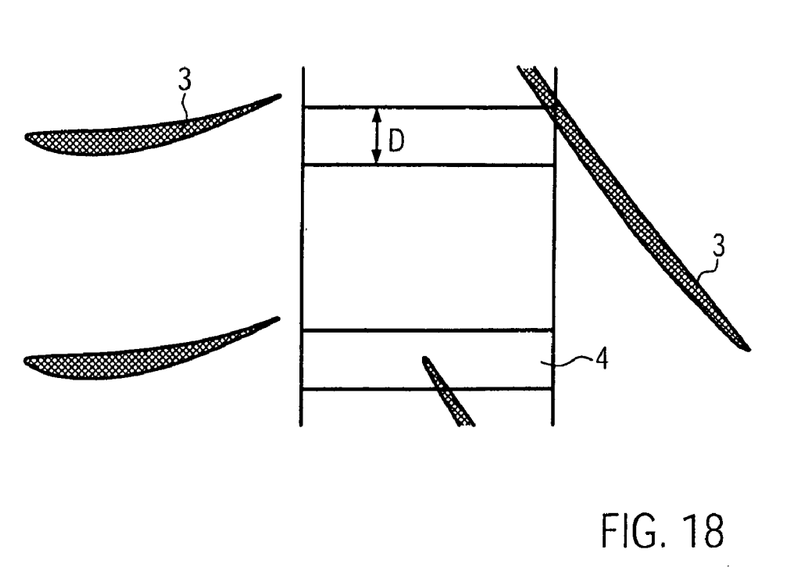

FIG. 18 shows the width of the grooves provided by the present invention which, in accordance with the present invention, is a maximum of 15 percent of the distance between one rotor blade and the next and is variable in dependence of the radial position and the axial position.

According to the present invention, the basic shape of the recesses can be angular, round or oval, it may also vary with the radial extension.

Furthermore, according to the present invention, the individual recesses can be equally dimensioned or differ within the limits of the above mentioned parameters.

Figures 19, 21:
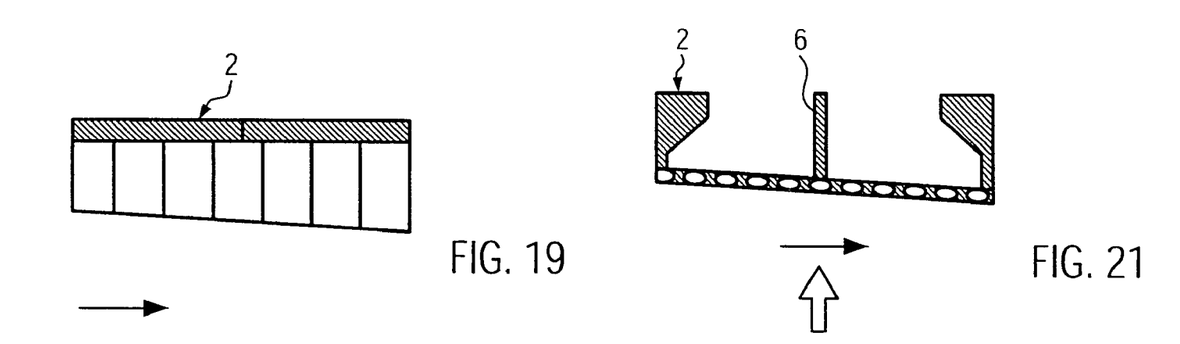
Figure 20:
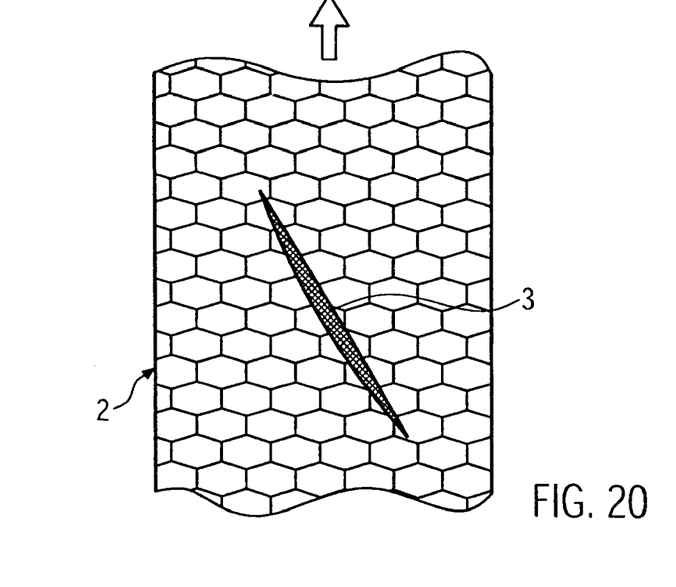
Figure 22:
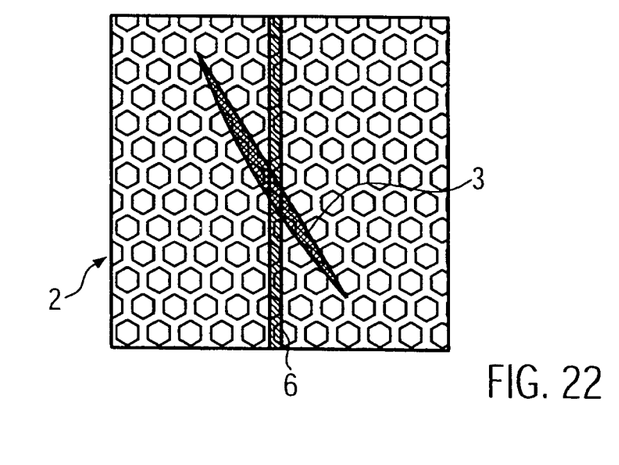

FIGS. 19-22 each show embodiments of the surfaces of the hub which can be favorable in accordance with the present invention. In FIGS. 19 and 21, the airflow is each indicated by the arrow pointing from the left to the right-hand side, while in FIGS. 20 and 22 the arrow indicates the direction of rotation. As can be seen from FIGS. 19 and 20, the surface of the hub may be provided with a honeycomb-style structure including hexagonal or round holes in rows arranged offset to each other in a densest package. In the example shown in FIGS. 21 and 22, the round or hexagonal holes are separated by webs of greater width, but again a honeycomb-style arrangement in a dense packing is provided in which the recesses are arranged in parallel rows and correspondingly offset. Reference numeral 6, schematically shows a separating ring.

What is claimed is:

1. A fluid flow machine comprising:
a casing;
a rotating shaft;
a flow path formed between the casing and the rotating shaft;
rows of blades positioned in the flow path;
a plurality of spaced apart recesses disposed circumferentially around a surface facing free blade tips of at least one row of blades in an area of the free blade tips, the recesses and the free blade tips being circumferentially movable relative to one another, the recesses being open to the free blade tips and otherwise closed, wherein a cross-section and position of each recess are defined as follows:
an axial arrangement is configured such that a partial length of the recess extends by a maximum of 30 percent of a chord length of a blade from a leading edge of the blade against a direction of flow, and up to a maximum of 50 percent of the chord length of the blade from the blade leading edge in the direction of flow, an angle β of a leading flank of the recess is inclined by 30° to 180° to a wall of the casing, an angle α of a trailing flank of the recess is inclined by 20° to 70° to the wall of the casing, a radial depth of the recess is a maximum of 50 percent of an axial chord length of the blade, an angle γ of a forward surface of the recess lies between 30° and 60° in a circumferential direction, and an inclination angle δ of a rearward surface of the recess lies between 30° and 60° in the circumferential direction;

wherein each recess extends along an axis to maintain a straight air flow through the recess.

2. The fluid flow machine of claim 1, wherein the recess has an angular cross-section.

3. The fluid flow machine of claim 1, wherein the recess has a round cross-section.

4. The fluid flow machine of claim 1, wherein the recess has an oval cross-section.

5. The fluid flow machine of claim 1, wherein the recess has a variable geometry.

6. The fluid flow machine of claim 1, wherein the recess has a cross-sectional configuration of a half-heart shape.

7. The fluid flow machine of claim 1, wherein a stagger angle ζ of a trailing edge of the recess lies between +30° and −30° in the axial direction.

8. The fluid flow machine of claim 1, wherein a width D of the recess is a maximum of 15 percent of a distance between one rotor blade and the next.

9. The fluid flow machine of claim 1, wherein the at least one recess is a circumferential groove on the facing surface.

10. The fluid flow machine of claim 1, wherein the at least one row of blades is a row of stator blades and the facing surface is a surface of the rotating shaft.

11. The fluid flow machine of claim 1, wherein the at least one row of blades is a row of rotor blades and the facing surface is a surface of the casing.

12. The fluid flow machine of claim 1, wherein the depth of the recess is approximately 35 percent of the axial chord length of the blade.

13. The fluid flow machine of claim 12, wherein the recess has a cross-sectional configuration of a half-heart shape.

14. The fluid flow machine of claim 13, wherein a degree of coverage, which is defined as a ratio of the open areas of the at least one recess and the area circumferentially confined by the at least one recess, is less than 50 percent.

15. The fluid flow machine of claim 14, wherein the degree of coverage is less than 30 percent.

16. The fluid flow machine of claim 15, wherein a stagger angle ε of a leading edge of the recess lies between +30° and −30° in an axial direction.

17. The fluid flow machine of claim 16, wherein a stagger angle ζ of a trailing edge of the recess lies between +30° and −30° in the axial direction.

18. The fluid flow machine of claim 17, wherein a width D of the recess is a maximum of 15 percent of a distance between one rotor blade and the next.

19. The fluid flow machine of claim 1, wherein a degree of coverage, which is defined as a ratio of the open areas of the at least one recess and the area circumferentially confined by the at least one recess, is less than 50 percent.

20. The fluid flow machine of claim 19, wherein the degree of coverage is less than 30 percent.

21. The fluid flow machine of claim 1, wherein a stagger angle ζ of a leading edge of the recess lies between +30° and −30° in an axial direction.

22. The fluid flow machine of claim 21, wherein a stagger angle (of a trailing edge of the recess lies between +30° and −30° in the axial direction.

23. The fluid flow machine of claim 1, and further comprising a plurality of the recesses in a repeating pattern around a circumference of the facing surface.

24. The fluid flow machine of claim 23, wherein the plurality of recesses are predominately axially aligned.

* * * * *